(12) United States Patent
Wu et al.

(10) Patent No.: US 10,863,249 B2
(45) Date of Patent: Dec. 8, 2020

(54) BROWSER-BASED EMBEDDED OPERATION METHOD, TELEVISION SET AND STORAGE DEVICE

(71) Applicant: SHENZHEN CHUANGWEI-RGB ELECTRONIC CO., LTD, Shenzhen (CN)

(72) Inventors: Wenhui Wu, Shenzhen (CN); Jie Zhao, Shenzhen (CN); Bei Shi, Shenzhen (CN); Jianqiang Yuan, Shenzhen (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 2 days.

(21) Appl. No.: 16/327,102

(22) PCT Filed: Feb. 10, 2018

(86) PCT No.: PCT/CN2018/076102
§ 371 (c)(1),
(2) Date: Feb. 21, 2019

(87) PCT Pub. No.: WO2019/033724
PCT Pub. Date: Feb. 21, 2019

(65) Prior Publication Data
US 2019/0182560 A1    Jun. 13, 2019

(30) Foreign Application Priority Data
Aug. 17, 2017 (CN) .......................... 2017 1 0704811

(51) Int. Cl.
*H04N 21/443* (2011.01)
*H04N 21/4782* (2011.01)
(Continued)

(52) U.S. Cl.
CPC ......... *H04N 21/818* (2013.01); *H04N 21/443* (2013.01); *H04N 21/4782* (2013.01); *H04N 21/4852* (2013.01); *H04N 21/4854* (2013.01)

(58) Field of Classification Search
CPC .................. H04N 21/4782; H04N 21/485
See application file for complete search history.

(56) References Cited

U.S. PATENT DOCUMENTS

| | | | | |
|---|---|---|---|---|
| 2010/0313223 A1* | 12/2010 | Straub | ............ | H04N 21/485 725/60 |
| 2012/0209975 A1* | 8/2012 | Zong | ............ | H04N 1/00464 709/223 |
| 2014/0053179 A1* | 2/2014 | Voth | ............ | H04N 5/44 725/14 |

FOREIGN PATENT DOCUMENTS

| CN | 102075800 A | 5/2011 |
|---|---|---|
| CN | 103412748 A | 11/2013 |

(Continued)

OTHER PUBLICATIONS

The World Intellectual Property Organization (WIPO) International Search Report for PCT/CN2018/076102 dated May 8, 2018 5 Pages.

*Primary Examiner* — Hsiungfei Peng
(74) *Attorney, Agent, or Firm* — Anova Law Group, PLLC

(57) ABSTRACT

The invention discloses a browser-based embedded operation method, a television set and a storage device. A functional requirement of an operating system available to a browser-based embedded device is obtained; an interface for system operations by a user is set by using a predetermined language; a web layer interface for invoking the interface directly is set and an adaptation layer interface for data interaction with the web layer interface is set; a Linux function interface is set based on the adaptation layer (Continued)

interface and a communication way between the web layer interface and the adaptation layer interface is set; and according to the obtained user operation, an interface response is carried out and functional feedback is carried out by a television set. Therefore, the interface design becomes convenient and the interface effect of the embedded device is enhanced.

13 Claims, 3 Drawing Sheets

(51) Int. Cl.
  *H04N 21/482* (2011.01)
  *H04N 21/485* (2011.01)
  *H04N 21/81* (2011.01)

(56) References Cited

FOREIGN PATENT DOCUMENTS

| CN | 106412466 A | 2/2017 |
|---|---|---|
| CN | 107396196 A | 11/2017 |

\* cited by examiner

BROWSER-BASED EMBEDDED OPERATION METHOD, TELEVISION SET AND STORAGE DEVICE

CROSS-REFERENCE TO RELATED APPLICATION

This application is a national stage application of PCT Patent Application No. PCT/CN2018/076102, filed on 10 Feb. 2018, which claims priority to Chinese Patent Application No. 201710704811.3, filed on 17 Aug. 2017, the content of all of which is incorporated herein by reference.

FIELD OF THE INVENTION

The present invention relates to the field of television technology, and more particularly, to a browser-based embedded operation method, a television set and a storage device.

BACKGROUND

With a popularization of a plurality of intelligent electronic devices, a plurality of home appliances including a television are becoming more intelligent and more clustered, but a system of the intelligent electronic devices in the prior art are mainly using an Android system, requiring a higher configuration requirement, also, due to a fast update frequency of a plurality of applications, the applications require a frequent upgradation and installation to solve a plurality of application problems thereof. A user needs to perform the upgradations frequently, and that cannot meet a need of the user on convenience.

Therefore, the current technology needs to be improved and developed.

BRIEF SUMMARY OF THE DISCLOSURE

A technical problem to be solved by the present invention is, according to the defects in the prior art, providing a browser-based embedded operation method, a television set and a storage device, applied to solving a plurality of problems including a cross-platforms transplanting convenience of an embedded system, a web application browsing convenience, and realizing a plurality of basic functions, so as to achieve a cross-platform of an interface design of a television, make the interface design more convenient, as well as improving an interface effect of the embedded device. Additionally, by using a docking interface of the cross-platform network communication interface and a Linux underlying interface, a web interface is made being able to interact with a Linux bottom layer, thus a basic function of a television set is achieved, and using a plurality of web applications on the television set is available.

In order to solve the technical problems mentioned above, the technical solution of the present invention is as follows:

A browser-based embedded operation method, wherein comprising:

acquiring a plurality of functional requirements of an operation system available for a browser-based embedded device;

setting an interface for a user to perform a system operation by using a predetermined language according to the functional requirements;

setting a web layer interface calling directly the interface according to the functional requirements, and setting an adaptation layer interface for performing a data interaction with the web layer interface;

setting a Linux function interface according to the adaptation layer interface, and setting a communication manner between the web layer interface and the adaptation layer interface;

performing an interface response according to a user's operation obtained, and performing a function feedback through the television set.

The browser-based embedded operation method, wherein the predetermined language comprises: an html language, a js language and a css language.

The browser-based embedded operation method, wherein setting an interface for a user to perform a system operation by using a predetermined language according to the functional requirements, wherein the interface comprises: an image brightness value setting interface, a volume setting interface, a channel setting interface, and a screen contrast setting interface.

The browser-based embedded operation method, wherein the Linux function interface is applied to connecting with the adaptation layer interface, and the adaptation layer interface obtains a plurality of television set parameters from the Linux bottom layer and returns to the web layer interface, the Linux function interface provides a plurality of data and calling required by the web layer interface.

The browser-based embedded operation method, wherein setting a communication manner between the web layer interface and the adaptation layer interface, wherein the communication manner comprises a web socket communication and an IPC communication.

The browser-based embedded operation method, wherein setting a communication manner between the web layer interface and the adaptation layer interface, wherein a sending content sent in the communication manner comprises: sending a defined message, sending an event, sending a button processing, and sending a data.

The browser-based embedded operation method, wherein setting a Linux function interface according to the adaptation layer interface, and setting a communication manner between the web layer interface and the adaptation layer interface, comprising specifically:

acquiring a plurality of parameters for the web layer interface that is required to set the television set;

sending a message to the adaptation layer interface, and notifying the adaptation layer to process by a corresponding communication manner;

after the adaptation layer finishes processing, the message is fed back to the web layer interface in a manner of data;

the web layer interface notifies the web interface to make a data display.

The browser-based embedded operation method, wherein performing an interface response according to a user's operation obtained, and performing a function feedback through the television set, comprising specifically:

obtaining an operation instruction for a user to operate the television set parameters;

the web interface makes a display, and modifies a parameter;

the Linux function interface receives a corresponding actual setting before controlling the television set finish a parameter setting.

The browser-based embedded operation method, wherein the function requirements comprising: setting a TV, switching a TV station, and adjusting a volume.

The browser-based embedded operation method, wherein setting the web layer interface according to the function requirements, the web layer interface makes the interface applied for a user to performing the system operation be called directly, applied to making a data interaction to the adaptation layer interface, including obtaining and setting the image brightness value of the adaptation layer.

The browser-based embedded operation method, wherein setting the adaptation layer interface, the adaptation layer is applied to connecting a Linux interface of a bottom layer, the Linux interface is related to a platform, a specific platform has a different interface implementation, after the different interface implementations are exposed by the adaptation layer, a plurality of external adaption layer interfaces are consistent.

The browser-based embedded operation method, wherein according to a requirement of the web layer interface, the adaptation layer performs a data feedback.

The browser-based embedded operation method, wherein according to a user's operation, an interface response and a performance feedback on a plurality of TV functions is performed; after obtaining the image brightness values, the web interface makes a display; the web interface modifies the brightness value, the Linux interface achieves a correspond actual setting, and the brightness value of the TV is modified.

A television set, wherein comprising: a processor, a memory communicating with the processor, the memory stores a computer program, applied to implementing the browser-based embedded operation method when being executed; the processor is applied to calling the computer program in the memory, to implement the browser-based embedded operation method.

A storage device, wherein the storage device stores the computer programs, the computer programs are able to execute the browser-based embedded operation method.

Benefits: The present invention discloses a browser-based embedded operation method, a television set and a storage device, the method comprises: acquiring a plurality of functional requirements of an operation system available for a browser-based embedded device; setting an interface for a user to perform a system operation by using a predetermined language according to the functional requirements; setting a web layer interface calling directly the interface, and setting an adaptation layer interface for performing a data interaction with the web layer interface according to the functional requirements; setting a Linux function interface according to the adaptation layer interface, and setting a communication manner between the web layer interface and the adaptation layer interface; performing an interface response according to a user's operation obtained, and performing a function feedback through the TV set. The present invention achieves a cross-platform for a TV set interface design, making a design of an interface more convenient, and an interface effect of the embedded device is enhanced. In addition, using a cross-platform network communication interface to connect an interface and a Linux bottom layer interface, making a web interface be able to interact with a Linux bottom layer, achieving a basic function of a TV set, as well as being able to perform a web application in the TV set.

DETAILED DESCRIPTION OF EMBODIMENTS

The present invention provides a browser-based embedded operation method, a television set and a storage device, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
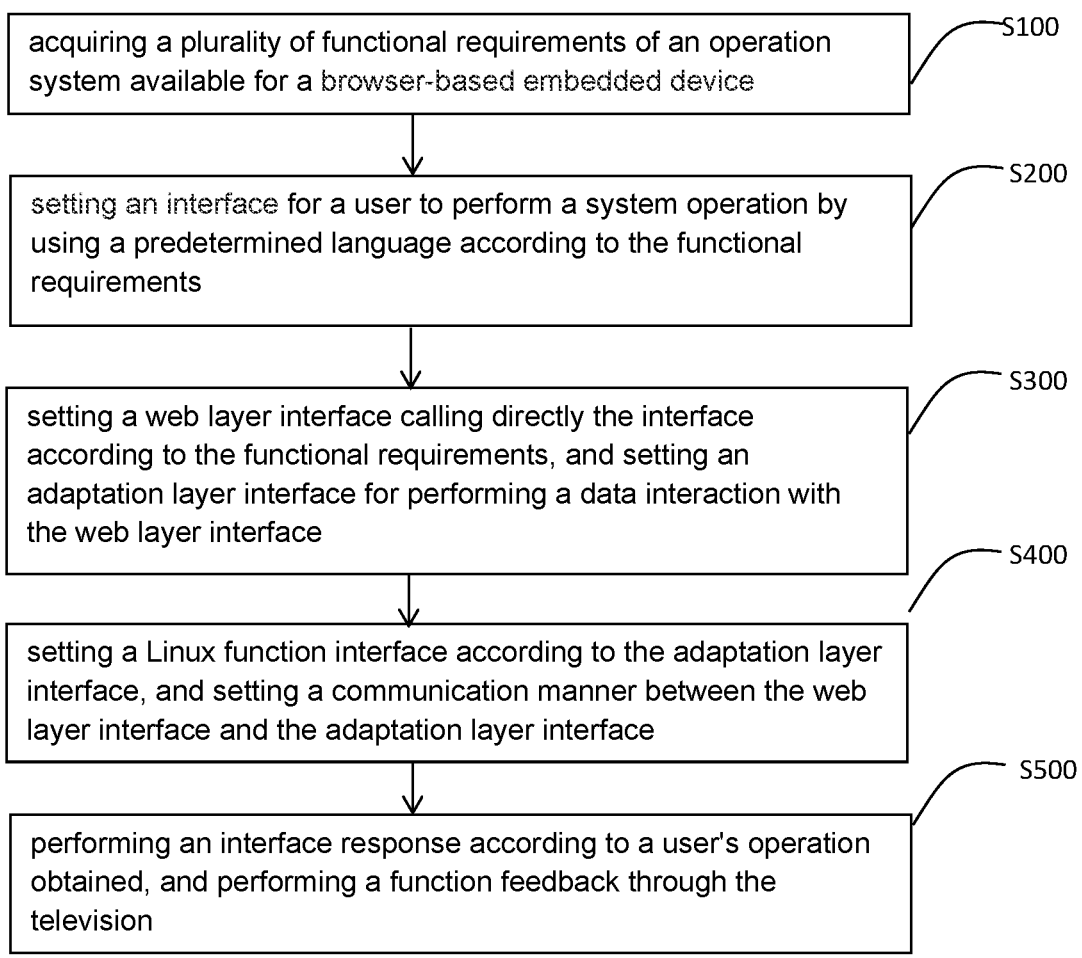
FIG. 1 illustrates a flow chart on a preferred embodiment of the browser-based embedded operation method disclosed in the present invention.

A browser-based embedded operation method disclosed in a preferred embodiment of the present invention, shown as FIG. 1, the method comprises:

S100, acquiring a plurality of functional requirements of an operation system available for a browser-based embedded device.

Specifically, a designer of a product shall propose a plurality of functional requirements of an operating system available for a browser-based embedded device, which is equivalent to listing a list of a plurality of TV function requirements, such as setting a TV, switching a TV station, and adjusting a volume, that is, a plurality of basic functions of a TV set.

S200, setting an interface for a user to perform a system operation by using a predetermined language according to the functional requirements.

Specifically, according to the function requirements obtained from the step S100, the designer makes a browser-based interface design, including using a plurality of related languages (the related languages include: an html language, a js language and a css language) to perform a page effect design, such as an interface for setting a brightness value of an image, making a user be able to perform a system operation.

Further, setting an interface for a user to perform a system operation by using a predetermined language according to the functional requirements, wherein the interface comprises: an image brightness value setting interface, a volume setting interface, a channel setting interface, and a screen contrast setting interface.

S300, setting a web layer interface calling directly the interface according to the functional requirements, and setting an adaptation layer interface for performing a data interaction with the web layer interface.

Specifically, setting a web layer interface according to the functional requirements, the web layer interface allows the interface designed in the S200 be able to be called directly, applied to performing a data interaction with the adaptation layer interface, such as acquiring before setting an image brightness value in the adaptation layer. Setting the adaptation layer interface, the adaptation layer is applied to connecting a Linux interface of a bottom layer, the Linux interface is related to a platform (the platform is a different chip architecture, such as a realtek chip and a Mstar chip), a specific platform has a different interface implementation, however, after being exposed by the adaptation layer, a plurality of external adaption layer interfaces are consistent. According to a requirement of the web layer interface, the adaption layer performs a data feedback, making the interface of the TV set and the web layer interface be able to isolate from a design of the platform, ensuring a versatility of the web layer interface and achieving a cross-platform transplantation, for example, obtaining an image brightness value from the Linux bottom layer, before returning to the web interface.

Figure 2:
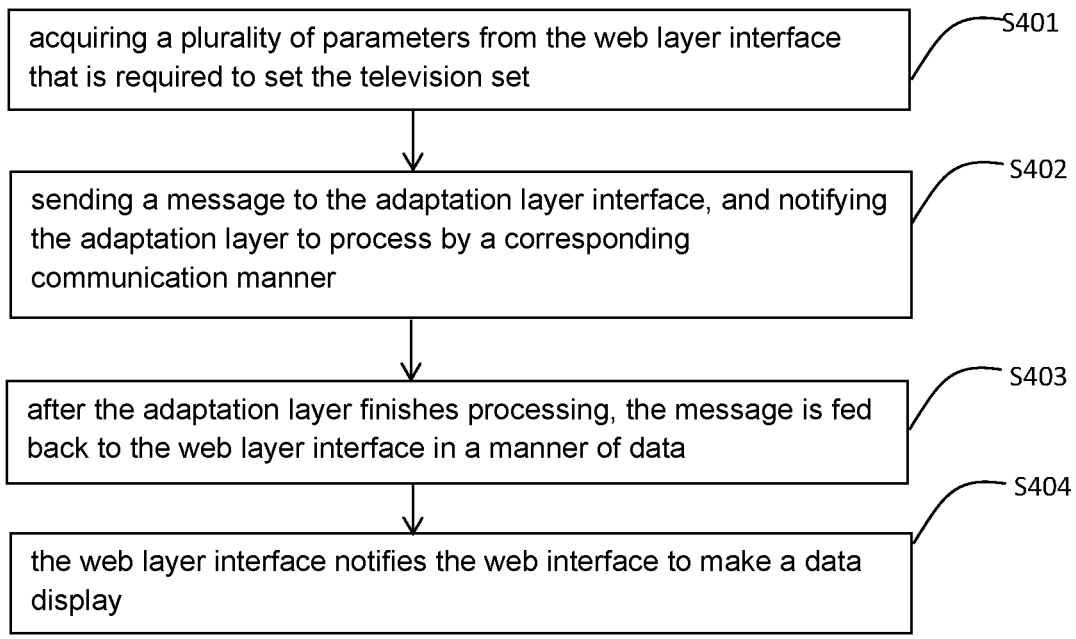
FIG. 2 illustrates a flow chart on a preferred embodiment ofsetting a communication manner between the web layer interface and the adaptation layer interface in the browser-based embedded operation method disclosed in the present invention.

S400, setting a Linux function interface according to the adaptation layer interface, and setting a communication manner between the web layer interface and the adaptation layer interface;

Further, shown as FIG. 2, the step S400 comprises specifically:

S401, acquiring a plurality of parameters from the web layer interface that is required to set the television set;

S402, sending a message to the adaptation layer interface, and notifying the adaptation layer to process by a corresponding communication manner;

S403, after the adaptation layer finishes processing, the message is fed back to the web layer interface in a manner of data;

S404, the web layer interface notifies the web interface to make a data display.

Specifically, according to a design of the adaptation layer, designing a plurality of specific related function modules to a Linux implementation, and designing a plurality of interfaces, the interface is related to the platform, a specific platform has a different interface implementation, such as when setting the image brightness value, a different platform has a different bitmap mapping, there may be a plurality of different implementations. For example, the Linux function interface is applied to connecting the adaptation layer interface, the adaptation layer interface obtains a plurality of TV set parameters from the Linux bottom layer before returning to the web layer interface, the Linux function interface provides a plurality of data and calling required by the web layer interface.

Wherein, setting a communication manner between the web layer interface and the adaptation layer interface, wherein the communication manner comprises a web socket communication (WebSocket is a very important feature in an HTML5 specification, which allows a user to implement a two-way communication in the browser and realizes a timely push of data. A significance of this technology is that a user may implement many applications that were previously impossible to achieve through a plurality of web pages), and an IPC communication (Inter-Process Communication, a plurality of techniques or methods for transmitting data or signals between at least two processes or threads).

To achieve a cross-platform function for an interface designed, a method having a smaller relationship with the platform design shall be implemented to make a data transmission, (that is, the browser needs to communicate with Linux to obtain a return data of the adaptation layer interface, or operate the data, thus, it is needed to ensure that the communication manner preferably has nothing to do with the platform, otherwise, with a different protocol, the web interface on the browser interface applied to obtaining the data shall be rewritten) to ensure using the interfaces, thus a communication manner between the web interface and the adaptation layer interface shall be designed.

A network communication manner (both the web socket communication and the IPC communication belong to the network communication) is a preferred method having a better cross-platform character, with a better reliability and a better feature, thus using the network communication manner to implement the communication design. In addition, setting a communication manner between the web layer interface and the adaptation layer interface, wherein a sending content sent in the communication manner comprises: sending a defined message, sending an event, sending a button processing, and sending a data. For example, when the web layer interface obtains an image brightness value, a message is sent to the adaptation layer, which is achieved by a designed communication manner, and after the adaptation layer finishing processing, the message is fed back to the web layer interface in a manner of data, the web layer interface notifies the web interface to make a data display.

S500, performing an interface response according to a user's operation obtained, and performing a function feedback through the television.

Figure 3:
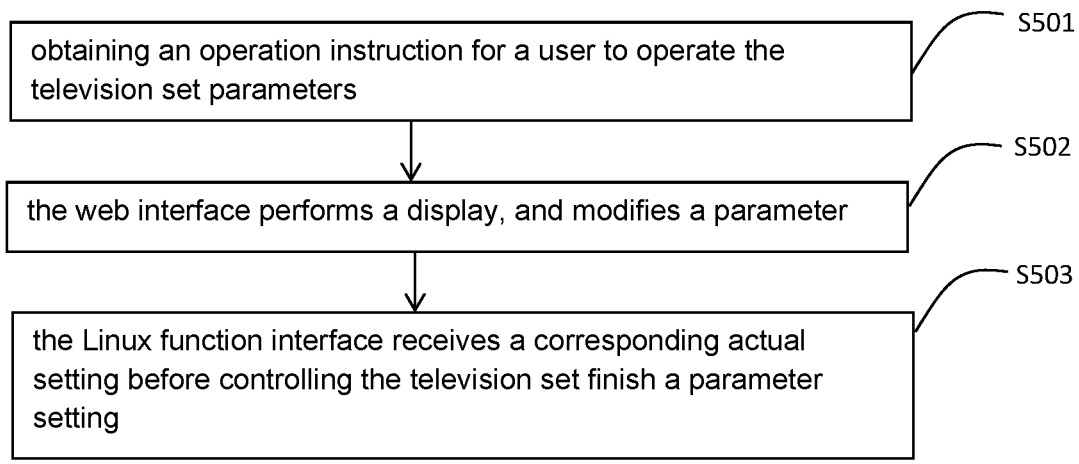
FIG. 3 illustrates a flow chart on a preferred embodiment of performing an interface response according to a user's operation obtained, and performing a function feedback through the television in the browser-based embedded operation method disclosed in the present invention.

Further, shown as FIG. 3, the step S500 comprises specifically:

S501, obtaining an operation instruction for a user to operate the television set parameters;

S502, the web interface performs a display, and modifies a parameter;

S503, the Linux function interface receives a corresponding actual setting before controlling the television set finish a parameter setting.

Specifically, according to a user's operation (such as adjusting the brightness, a contrast, the voice and more), an interface response and a performance feedback of the TV are performed, for example, after obtaining the image brightness values, the web interface performs a display; the web interface modifies the brightness value, the Linux interface achieves a corresponding actual setting, making a brightness of the TV get modified.

The browser-based embedded operation method disclosed by the present invention, first uses a web mode to design an interface of the system, solving a problem that a non-Android TV has a poor interface effect. In addition, adopting a layered design mode, the interface design and the Linux function are designed separately, without affecting each other, and realizing a communication between each other through a cross-platform network communication manner. The cross-platform design of the interfaces is truly realized, and a secondary development is convenient.

Figure 4:
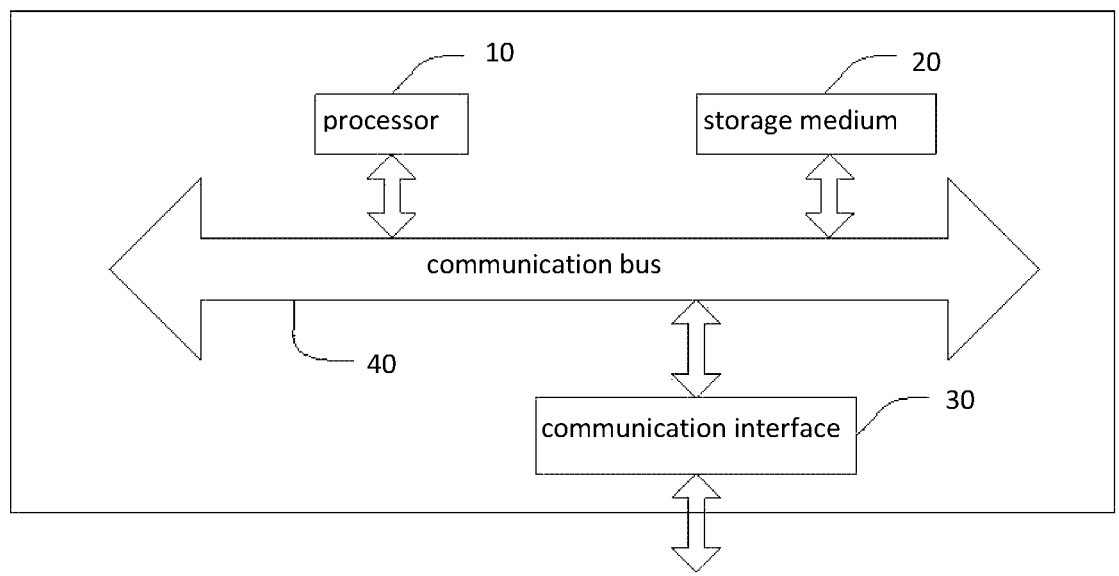
FIG. 4 illustrates a block diagram on a functional principle of a television set in a preferred embodiment of the present invention.

The present invention further provides a TV set, shown as FIG. 4, the TV set comprises: a processor 10, a memory 20, a communication interface 30 and a communication bus 40; wherein:

the processor 10, the memory 20 and the communication interface 30 achieve an intercommunication through the communication bus 40;

the communication interface 30 is applied to transmitting information between a plurality of communication devices of the TV set;

the processor 10 is applied to call a computer program stored in the memory 20, applied to implementing the methods stated in a plurality of method embodiments above, for example, comprising: acquiring a plurality of functional requirements of an operation system available for a browser-based embedded device; setting an interface for a user to perform a system operation by using a predetermined language according to the functional requirements; setting a web layer interface calling directly the interface according to the functional requirements, and setting an adaptation layer interface for performing a data interaction with the web layer interface; setting a Linux function interface according to the adaptation layer interface, and setting a communication manner between the web layer interface and the adaptation layer interface; performing an interface response according to a user's operation obtained, and performing a function feedback through the television set.

The present invention further discloses a storage device, wherein the storage device stores a plurality of computer programs, the computer programs are able to be executed to implement the browser-based embedded operation method.

All above, the present invention discloses a browser-based embedded operation method, a television set and a storage device, the method comprises: acquiring a plurality of functional requirements of an operation system available for a browser-based embedded device; setting an interface for a user to perform a system operation by using a predetermined language; setting a web layer interface calling directly the interface, and setting an adaptation layer interface for performing a data interaction with the web layer interface; setting a Linux function interface according to the adaptation layer interface, and setting a communication manner between the web layer interface and the adaptation layer interface; performing an interface response according to a user's operation obtained, and performing a function feedback through the TV set. The present invention achieves a cross-platform for a TV set interface design, making a design of an interface more convenient, and an interface effect of the embedded device is enhanced. In addition, using a cross-platform network communication interface to connect an interface and a Linux bottom layer interface, making a web interface be able to interact with a Linux bottom layer, achieving a basic function of a TV set, as well as being able to perform a web application in the TV set.

Of course, those skilled in the art can understand that all or part of the processes in the foregoing embodiments can be implemented by using a computer program to instruct a plurality of related hardware (such as a processor, a controller, etc.), and the program may be stored in a computer readable storage medium, the program, when being executed, may include the processes of the various embodiments on methods as described above. The storage medium described therein may be a memory, a magnetic disk, an optical disk, or the like.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A browser-based embedded operation method, comprising:
acquiring a plurality of functional requirements of an operation system available for a browser-based embedded device of a television;
configuring a web user interface for a user to perform a system operation by using a predetermined language according to the functional requirements;
configuring a web layer interface calling directly the web user interface according to the functional requirements, and configuring an adaptation layer interface for performing a data interaction with the web layer interface;
configuring a Linux function interface according to the adaptation layer interface, and configuring a communication manner between the web layer interface and the adaptation layer interface, including
acquiring a plurality of parameters for the web layer interface that are required to configure the television;
sending a message to the adaptation layer interface, and notifying the adaptation layer to process by the corresponding communication manner;
after the adaptation layer finishes processing, feeding the message back to the web layer interface;
notifying, by the web layer interface, the web user interface to perform a data display;
performing an interface response according to an operation received from the user, and performing a function feedback through the television, including:
obtaining an operation instruction for the user to configure television parameters;
displaying and modifying the television parameters through the web user interface; and
receiving, by the Linux function interface, a corresponding actual parameter configuration before controlling the television to finish configuring the television parameters.

2. The browser-based embedded operation method according to claim 1, wherein the predetermined language comprises: an html language, a js language and a css language.

3. The browser-based embedded operation method according to claim 1, wherein the web user interface comprises: an image brightness value configuration interface, a volume configuration interface, a channel configuration interface, and a screen contrast configuration interface.

4. The browser-based embedded operation method according to claim 1, wherein the Linux function interface is applied to connecting with the adaptation layer interface, and the adaptation layer interface obtains the television parameters from a Linux bottom layer and returns to the web layer interface, the Linux function interface provides a plurality of data and calling required by the web layer interface.

5. The browser-based embedded operation method according to claim 1, wherein configuring a communication manner between the web layer interface and the adaptation layer interface, wherein the communication manner comprises a web socket communication and an IPC communication.

6. The browser-based embedded operation method according to claim 1, wherein a sending content sent in the communication manner comprises: sending a defined message, sending an event, sending a button processing, and sending data.

7. The browser-based embedded operation method according to claim 1, wherein the function requirements includes: configuring a TV, switching a TV station, and adjusting a volume.

8. The browser-based embedded operation method according to claim 1, wherein the web layer interface makes the web user interface applied for a user to performing the system operation be called directly, applied to making a data interaction to the adaptation layer interface, including obtaining and configuring the image brightness value of the adaptation layer.

9. The browser-based embedded operation method according to claim 8, wherein the adaptation layer is applied to connecting a Linux interface of a bottom layer, the Linux interface is related to a platform, a specific platform has a different interface implementation, after the different interface implementations are exposed by the adaptation layer, a plurality of external adaption layer interfaces are consistent.

10. The browser-based embedded operation method according to claim 9, wherein according to a requirement of the web layer interface, the adaptation layer performs a data feedback.

11. The browser-based embedded operation method according to claim 1, wherein according to a user's operation, an interface response and a performance feedback on a plurality of TV functions is performed; after obtaining the image brightness values, the web user interface makes a display; the web user interface modifies the brightness value, the Linux interface achieves a corresponding actual setting, and the brightness of the TV is modified.

12. A television set, comprising: a processor, a memory communicating with the processor, the memory stores a computer program, applied to implementing the browser-based embedded operation method according to claim 1, when being executed; the processor is applied to calling the computer program in the memory, to implement the browser-based embedded operation method according to claim 1.

13. A storage device, wherein the storage device stores the computer programs, the computer programs are able to execute the browser-based embedded operation method according to claim 1.

* * * * *